US012793064B2

(12) United States Patent
Bhoyar et al.

(10) Patent No.: US 12,793,064 B2
(45) Date of Patent: Nov. 10, 2026

(54) SYSTEM AND METHOD FOR PROVIDING DATA PRIVACY IN A BLOCKCHAIN NETWORK

(71) Applicant: NATIONAL PAYMENTS CORPORATION OF INDIA, Mumbai (IN)

(72) Inventors: Sarang Vinayak Bhoyar, Nagpur (IN); Tittu Varghese, Alappuzha (IN); Vishal Anand Kanvaty, Hyderabad (IN)

(73) Assignee: National Payments Corporation of India, Mumbai (IN)

( * ) Notice: Subject to any disclaimer, the term of this patent is extended or adjusted under 35 U.S.C. 154(b) by 46 days.

(21) Appl. No.: 18/833,711

(22) PCT Filed: Dec. 14, 2022

(86) PCT No.: PCT/IB2022/062196
§ 371 (c)(1),
(2) Date: Jul. 26, 2024

(87) PCT Pub. No.: WO2023/111884
PCT Pub. Date: Jun. 22, 2023

(65) Prior Publication Data

US 2025/0165970 A1 May 22, 2025

(30) Foreign Application Priority Data

Dec. 17, 2021 (IN) ............................ 202121059064

(51) Int. Cl.

| | |
|---|---|
| ***G06Q 20/40*** | (2012.01) |
| ***G06Q 20/38*** | (2012.01) |
| ***H04L 9/00*** | (2022.01) |

(52) U.S. Cl.
CPC ....... *G06Q 20/401* (2013.01); *G06Q 20/3827* (2013.01); *G06Q 20/389* (2013.01);
(Continued)

(58) Field of Classification Search
CPC ............ G06Q 20/401; G06Q 20/3827; G06Q 20/389; H04L 9/50
(Continued)

(56) References Cited

U.S. PATENT DOCUMENTS

| | | | | |
|---|---|---|---|---|
| 11,170,130 B1 * | 11/2021 | Blumberg | ............. | H04L 63/123 |
| 2019/0188704 A1 * | 6/2019 | Grendon | ............. | G06Q 20/223 |

(Continued)

FOREIGN PATENT DOCUMENTS

| | | | | |
|---|---|---|---|---|
| KR | 102304492 B1 | 9/2021 | | |
| WO | WO-2021154157 A1 * | 8/2021 | ............... | H04L 9/50 |

*Primary Examiner* — Courtney P Jones
(74) *Attorney, Agent, or Firm* — Sand, Sebolt & Wernow Co., LPA

(57) ABSTRACT

The present invention discloses a system (100) for providing data privacy in a blockchain network (20). The network (20) comprises a plurality of participating nodes and a clearing-house node. A data logging module (102) of a source node receives a request to conduct a transaction with a destination node, the request comprising transaction details. The data logging module (102) stores the transaction details in an off-chain database (30). An encryptor module (104) receives and encrypts the transaction details to generate a unique identifier. A broadcasting module (106) stores the unique identifier in a ledger and broadcasts the identifier to all the participating nodes in the network (100). A data sharing module (108) receives a private call from the destination node to request access to the transaction details. The data sharing module (108) shares the transaction details with the destination node upon successful validation of the identity of the destination node.

10 Claims, 9 Drawing Sheets

(52) U.S. Cl.
CPC ........... *H04L 9/50* (2022.05); *G06Q 2220/00* (2013.01); *H04L 2209/56* (2013.01)

(58) Field of Classification Search
USPC ............................................................ 705/75
See application file for complete search history.

(56) References Cited

U.S. PATENT DOCUMENTS

| | | | | |
|---|---|---|---|---|
| 2020/0028688 | A1* | 1/2020 | Takada | H04L 9/3247 |
| 2020/0084027 | A1* | 3/2020 | Duchon | G06F 21/602 |
| 2020/0219093 | A1 | 7/2020 | Malhotra et al. | |
| 2020/0228506 | A1* | 7/2020 | Shockley | H04L 9/0891 |
| 2021/0073913 | A1 | 3/2021 | Ingargiola et al. | |
| 2021/0083872 | A1* | 3/2021 | Desmarais | H04L 9/0894 |
| 2021/0117938 | A1* | 4/2021 | Arora | G06Q 20/389 |
| 2021/0150521 | A1* | 5/2021 | Pan | H04L 9/3247 |
| 2021/0158443 | A1* | 5/2021 | Kilgore | G06Q 20/401 |
| 2021/0166222 | A1* | 6/2021 | Hernandez Acosta | G06F 16/00 |
| 2021/0352142 | A1 | 11/2021 | Jayaram et al. | |
| 2022/0004647 | A1* | 1/2022 | Casella | G06F 21/64 |
| 2022/0253360 | A1* | 8/2022 | Mutha | G06F 11/1451 |
| 2022/0261798 | A1* | 8/2022 | Wright | G06Q 20/065 |
| 2024/0356755 | A1* | 10/2024 | Paunoiu | H04L 9/3247 |

* cited by examiner

SYSTEM AND METHOD FOR PROVIDING DATA PRIVACY IN A BLOCKCHAIN NETWORK

FIELD

The present disclosure generally relates to payment systems. More particularly, the present disclosure relates to a system and method for providing data privacy in a blockchain network.

Definitions

As used in the present disclosure, the following terms are generally intended to have the meaning as set forth below, except to the extent that the context in which they are used indicate otherwise.

Off-chain database: The term "off-chain database" hereinafter refers to a database that is stored outside of a blockchain and is not publicly accessible.

Participant Node(s): The expression 'Participant Node(s)' refers to a plurality of nodes that are permitted for communication to perform payment transactions.

Transaction Details: The expression "transaction details" refers to the details of a transaction such as price, asset, and ownership, that are recorded, verified, and settled across all nodes.

Node(s): The expression "node(s)" refers to electronic devices or peripheral devices, such as a computer, that participates in a blockchain network to perform payment transactions.

Clearing House Node: The expression "Clearing House Node" refers to an administrator node that is managed and controlled in a blockchain network to perform payment transactions.

Ledger: The expression "ledger" refers to a digital record containing a partial list of block creation events, a unique transaction identifier (ID), transaction data, and a hash of the transaction data associated with each of the events.

BACKGROUND

The background information herein below relates to the present disclosure but is not necessarily prior art.

Typically, in a blockchain network, all the details of transactions carried out by any subset of participant nodes are broadcasted to all the participant nodes in the network. In some implementations, all the details of transactions carried out by any subset of participant nodes within a group of participant nodes within the network are broadcasted to all the members in the group.

However, in the general implementations explained above, private transaction data between a subset of participant nodes is shared with all the participant nodes of the network. Even though, the data may be shared in an encrypted form, sharing it with all the participant nodes can lead to a data privacy issue, which is not desired.

Therefore, there is a need for a system and method for providing data privacy in a blockchain network which alleviates the above-mentioned drawbacks.

Objects

Some of the objects of the present disclosure, which at least one embodiment herein satisfies, are as follows:

It is an object of the present disclosure to ameliorate one or more problems of the prior art or to at least provide a useful alternative.

An object of the present disclosure is to provide a system and method for providing data privacy in a blockchain network.

Another object of the present disclosure is to provide a system and method for providing data privacy in a blockchain network that only allows the participant nodes involved in a transaction to receive the complete details of the transaction.

Still another object of the present disclosure is to provide a system and method for providing data privacy in a blockchain network that is easy to implement.

Yet another object of the present disclosure is to provide a system and method for providing data privacy in a blockchain network that ensures secure transaction processing.

Still another object of the present disclosure is to provide a system and method for providing data privacy in a blockchain network that is cost-effective.

Other objects and advantages of the present disclosure will be more apparent from the following description when read in conjunction with the accompanying figures, which are not intended to limit the scope of the present disclosure.

SUMMARY

The present disclosure envisages a system for providing data privacy in a blockchain network. The blockchain network comprises a plurality of participating nodes and a clearing house node. The system comprises a data logging module, an encryptor module, a broadcasting module, and a data sharing module. In an operative embodiment, the data logging module of an operative source participating node receives a request to conduct a transaction with an operative destination participating node. The transaction request comprises transaction details, wherein the transaction details include a plurality of data fields. The data fields can comprise one or more of a transaction identifier, a transaction amount, payment details of a payer of the transaction, and payment details of a payee of the transaction. In an embodiment, the payment details of the payer include a payment address containing an indicator of a financial entity associated with the payer and the payment details of the payee include a payment address containing an indicator of the financial entity associated with the payee. The data logging module stores the received transaction details in an off-chain database associated with the source participating node. The encryptor module of the source participating node receives the transaction details from the data logging module, encrypts the received transaction details, and generates a unique identifier corresponding to the transaction details. The broadcasting module of the source participating node maintains a ledger. The broadcasting module cooperates with the encryptor module to store the unique identifier in the ledger and broadcasts the unique identifier to all the participating nodes in the network. The data sharing module of the source participating node receives a private call from a destination participating node, wherein the private call is a request to access the complete transaction details. The data sharing module validates the identity of the destination participating node and shares the transaction details with the destination participating node upon successful validation.

Advantageously, the unique identifier comprises a first HASH of the transaction details encrypted using a pre-stored public key.

In an embodiment, the data sharing module validates the identity of the participating destination node by checking if the participating destination node was a part of the conducted transaction.

In an embodiment, the destination participating node comprises a decrypting module, a HASH generator, and a comparator. The decrypting module decrypts the unique identifier using a private key corresponding to the public key to obtain the first HASH. The HASH generator generates a second HASH corresponding to the complete transaction details received from the source participating node. The comparator compares the first HASH with the second HASH to verify the authenticity of the transaction details received from the source participating node.

Advantageously, the data logging module periodically compresses the transaction details stored in the off-chain database. Upon receiving the private call from the destination participating node, the data sharing module queries the off-chain database, extracts the compressed transaction details requested by the destination participating node, and de-compresses the extracted transaction details.

The present disclosure further envisages a method for providing data privacy in a blockchain network. The blockchain network comprises a plurality of distributed participating nodes and a clearing house node. The method comprises the following steps—

- receiving, by a data logging module of a source participating node of the network, a request to conduct a transaction with a destination participating node, the transaction request comprising transaction details;
- storing, by the data logging module, the transaction details in an off-chain database;
- generating, by an encryptor module of the source participating node, a unique identifier corresponding to the transaction details;
- storing, by a broadcasting module of the source participating node, the unique identifier in a ledger maintained by the broadcasting module;
- broadcasting, by the broadcasting module, the unique identifier to all the participating nodes;
- receiving, by a data sharing module of the source participating node, a private call from a destination participating node, wherein the private call is a request to access the complete transaction details;
- validating, by the data sharing module, the identity of the destination participating node; and
- sharing, by the data sharing module, the unique identifier and the complete transaction details with the destination participating node upon successful validation.

BRIEF DESCRIPTION OF THE ACCOMPANYING DRAWING

A system and method for providing data privacy in a blockchain network of the present disclosure will now be described with the help of the accompanying drawing, in which.

LIST OF REFERENCE NUMERALS

10—Typical blockchain network
20—Blockchain network in accordance with present disclosure
30—Off-chain database
50—Off-chain database associated with first participant node
52—Transaction request
54—First participant node
56, 64—Transaction details
56', 64'—Unique identifier
58—Ledger
60—Off-chain database associated with Destination Participating Node
62—Destination Participating Node
A-F—Nodes
$T_{AB}$—Data of transaction between A and B
ID($T_{AB}$)—Unique identifier or HASH of $T_{AB}$
100—System
102—Data logging module
104—Encryptor module
106—Broadcasting module
108—Data sharing module
402—Decrypting module
404—Hash generator
406—Comparator

DETAILED DESCRIPTION

Embodiments, of the present disclosure, will now be described with reference to the accompanying drawing.

Embodiments are provided so as to thoroughly and fully convey the scope of the present disclosure to the person skilled in the art. Numerous details, are set forth, relating to specific components, and methods, to provide a complete understanding of embodiments of the present disclosure. It will be apparent to the person skilled in the art that the details provided in the embodiments should not be construed to limit the scope of the present disclosure. In some embodiments, well-known processes, well-known apparatus structures, and well-known techniques are not described in detail.

The terminology used, in the present disclosure, is only for the purpose of explaining a particular embodiment and such terminology shall not be considered to limit the scope of the present disclosure. As used in the present disclosure, the forms "a," "an," and "the" may be intended to include the plural forms as well, unless the context clearly suggests otherwise. The terms "including," and "having," are open ended transitional phrases and therefore specify the presence of stated features, integers, steps, operations, elements and/or components, but do not forbid the presence or addition of one or more other features, integers, steps, operations, elements, components, and/or groups thereof. The particular order of steps disclosed in the method and process of the present disclosure is not to be construed as necessarily requiring their performance as described or illustrated. It is also to be understood that additional or alternative steps may be employed.

When an element is referred to as being "connected to," or "coupled to" another element, it may be directly connected or coupled to the other element. As used herein, the term "and/or" includes any and all combinations of one or more of the associated listed elements.

Figure 1:
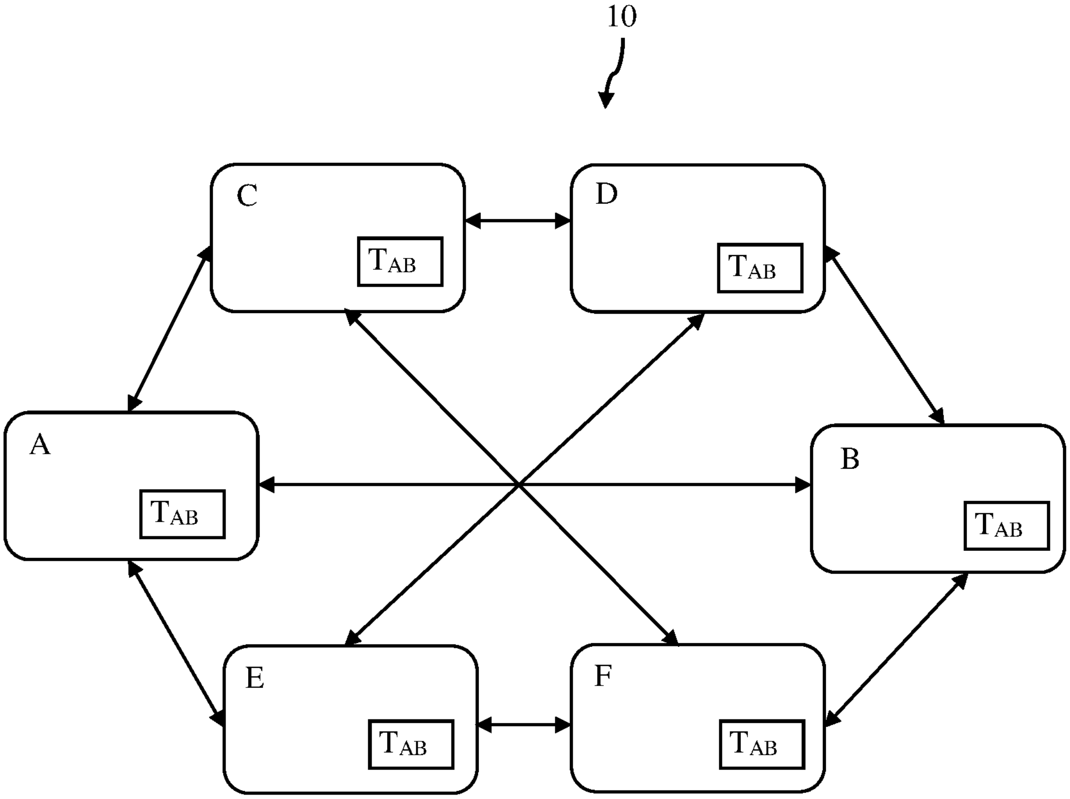
FIGURE 1 (Prior Art)
FIG. 1 illustrates transaction data sharing in a typical blockchain network, in accordance with an embodiment of the prior art.
Figure 2:
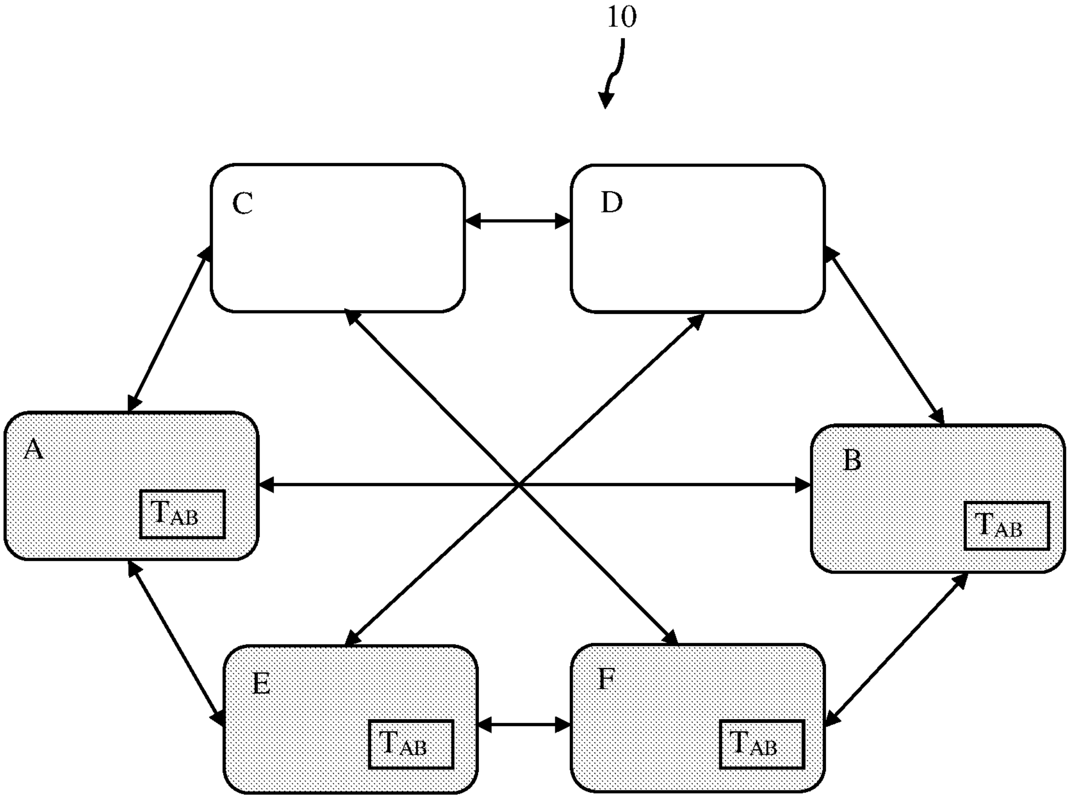
FIGURE 2 (Prior Art)
FIG. 2 illustrates transaction data sharing in a typical blockchain network, in accordance with another embodiment of the prior art.

FIGS. 1 and 2 illustrate transaction data sharing in conventional blockchain networks. Referring to FIG. 1, typically, in a blockchain network 10, all the details of transactions ($T_{AB}$) carried out by any subset of participant nodes (A-B) are broadcasted to all the participant nodes (A-F) of that network. In some implementations, all the details of transactions carried out by any subset of participant nodes (A, B) within a group (A, B, E, F) of participant nodes (A-F) within the network 10 are broadcasted to all the members/nodes (A, B, E, F) in the group. This implementation is shown in FIG. 2.

However, in the general implementations explained above, the transaction details corresponding to private transactions carried out between only a subset of participant nodes are shared with all the participant nodes. Although the shared data is in an encrypted form, it can lead to a data privacy issue, which is not desired.

In order to address the aforementioned problem, the present disclosure envisages a system (hereinafter referred to as "system 100") and method (hereinafter referred to as "method 200") for providing data privacy in a blockchain network. The system 100 and method are described with reference to FIG. 3A through FIG. 6.

Figure 3A:
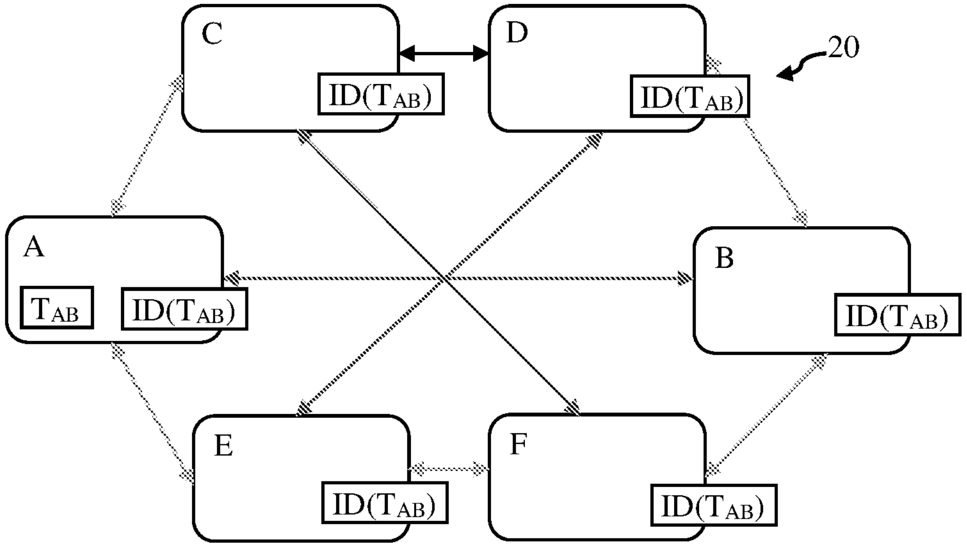
FIGS. 3A and 3B illustrate transaction data sharing in a blockchain network, in accordance with the present disclosure.
Figure 3B:
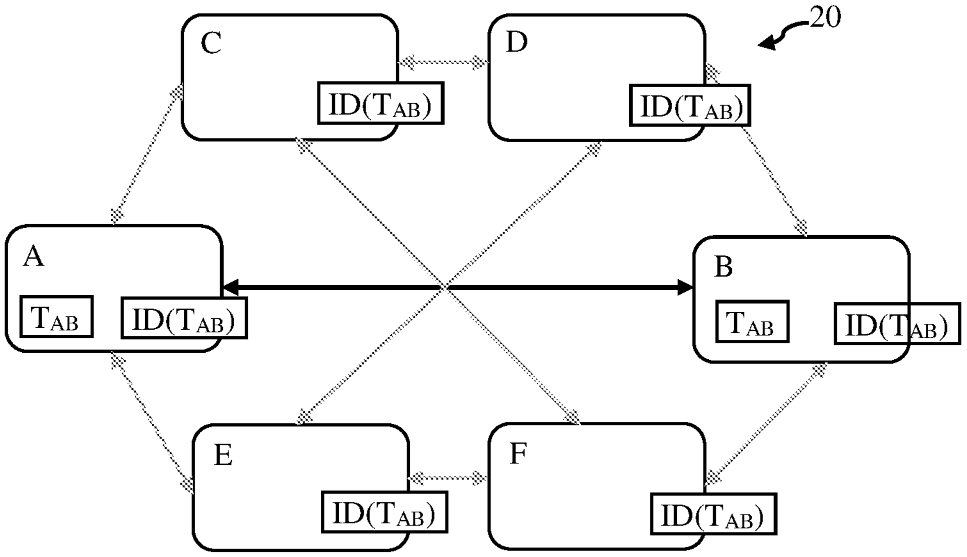

FIGS. 3A and 3B show a blockchain network 20 comprising a plurality of participating nodes (A-F) and a clearing house node (not shown). The blockchain network 20 is preferably a permissioned network, wherein only the nodes who have been approved by a network administrator can be made a part of the network 20. In an embodiment, the clearing house node is the administrator node and it is maintained by a clearing house. The participating nodes (A-F) can be related to banks, Application Service Providers (ASPs), Prepaid Payment Instruments (PPIs), Payment Service Providers (PSPs), or the like. The blockchain can additionally include a notary node. In an embodiment, the notary node is a Unique Identification Authority of India (UIDAI) node for facilitating biometric authentication. The participating nodes (A-F) are configured to receive payment requests through web interfaces or Application Programming Interfaces (APIs). Each participating node (A-F) is configured to maintain its own ledger. The blockchain network 100 has self-executing programs i.e., contracts containing a set of business rules which permit trusted transactions and agreements among the participating nodes (A-F).

Figure 4:
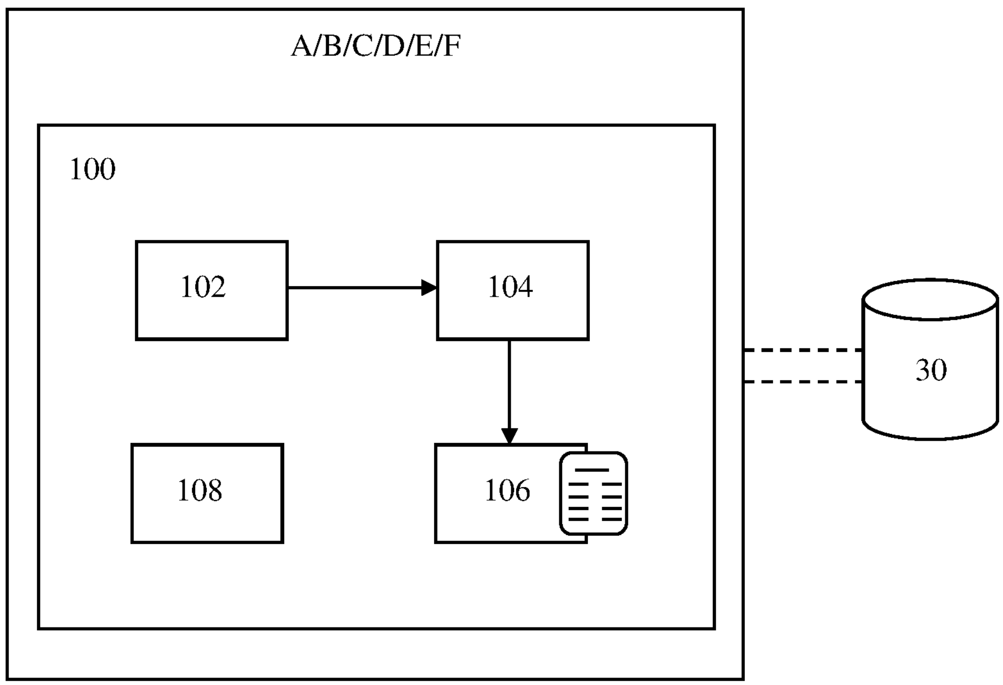
FIG. 4 illustrates a block diagram of a system for providing data privacy in a blockchain network, in accordance with the present disclosure.

Referring to FIG. 4, the system 100 envisaged in the present disclosure can be implemented in each participating node (A-F). The system 100 comprises a data logging module 102, an encryptor module 104, a broadcasting module 106, and a data sharing module 108.

In an operative embodiment, the data logging module 102 of an operative source participating node, is configured to receive a request to conduct a transaction with an operative destination participating node. The transaction request comprises transaction details, wherein the transaction details can comprise a plurality of data fields. The data fields include at least one of—a transaction identifier, a transaction amount, payment details of a payer of the transaction, and payment details of a payee of the transaction. The payment details can include, but are not limited to, a virtual payment address, a bank account number, debit/credit card payment information, and the like.

The data logging module 102 is further configured to store the received transaction details in an off-chain database 30 associated with the source participating node. The encryptor module 104, of the source participating node, is configured to receive the transaction details from the data logging module 102 and is further configured to encrypt the received transaction details and generate a unique identifier corresponding to the transaction details. In an embodiment, the unique identifier comprises a first HASH of the transaction details encrypted using a pre-stored public key of destination participating node. The HASH is a one-way irreversible function. This means that if a "HASH" is generated from the details containing 'n' number of data fields, then these data fields cannot be derived back from the HASH.

The broadcasting module 106, of the source participating node, is configured to maintain a ledger. The broadcasting module 106 is configured to cooperate with the encryptor module 104 to store the unique identifier in the ledger and broadcast the unique identifier to all the participating nodes (A-F) in the network 100. The data sharing module 108, of the source participating node, is configured to receive a private call from a destination participating node, wherein the private call is a request to access the complete transaction details. The data sharing module 108 is configured to validate the identity of the destination participating node, using any of the reliable identity validation technique available, and share the transaction details with the destination participating node upon successful validation.

Thus, in the above implementation, all the participant nodes (A-F) in a network 100 can access the HASH (referred to as 'first HASH') of the transactions carried out on the network 100 but only a source node can access the complete details of their respective transactions stored in the off-chain database 30.

Using the system 100 of the present disclosure, an on-chain data (e.g., Hashes of the transactions) is added to the ledger upon successful processing of the transaction requests by the participating nodes (A-F), and the off-chain database 30 is used to store information that is not published on the blockchain network 100 (for e.g., transaction data which doesn't uniquely define the transaction). This data will be accessible only to the nodes involved in the transaction. Thus, all the participating nodes (A-F) of the network 100 get access only to a limited number of details to confirm the transaction on the network 100. The participating nodes (A-F) do not get access to the private details of the transactions. Only the parties directly involved in the transaction securely receive complete details of the transaction. For example, for a particular transaction involving two banks and two Payment Service Providers (PSPs), only the concerned four participating nodes will post and receive transactions. All other banks/ASPs on the network will be able to only view a transaction header containing the HASH.

In an embodiment, the payment details of the payer include a payment address containing an indicator of a financial entity associated with the payer and the payment details of the payee include a payment address containing an indicator of the financial entity associated with the payee.

Accordingly, the data sharing module 108 validates the identity of the participating destination node by checking if the participating destination node was a part of the conducted transaction.

In an embodiment, the destination participating node comprises a decrypting module 402, a HASH generator 404, and a comparator 406. The decrypting module 402 is configured to decrypt the unique identifier using a private key corresponding to the public key of destination participating node to obtain the first HASH. The HASH generator 404 is configured to generate a second HASH corresponding to the complete transaction details received from the source participating node. The comparator 406 is configured to compare the first HASH with the second HASH to verify the authenticity of the transaction details received from the source participating node.

The off-chain database 30 of a node can be configured to store the complete transaction details corresponding to each of the transactions associated with the node.

Advantageously, the data logging module 102 is configured to periodically compress the transaction details stored in the off-chain database 30, wherein upon receiving the private call from the destination participating node, the data sharing module 108 is configured to query the off-chain database, extract the compressed transaction details requested by the destination participating node, and decompress the extracted transaction details.

Figure 5A:
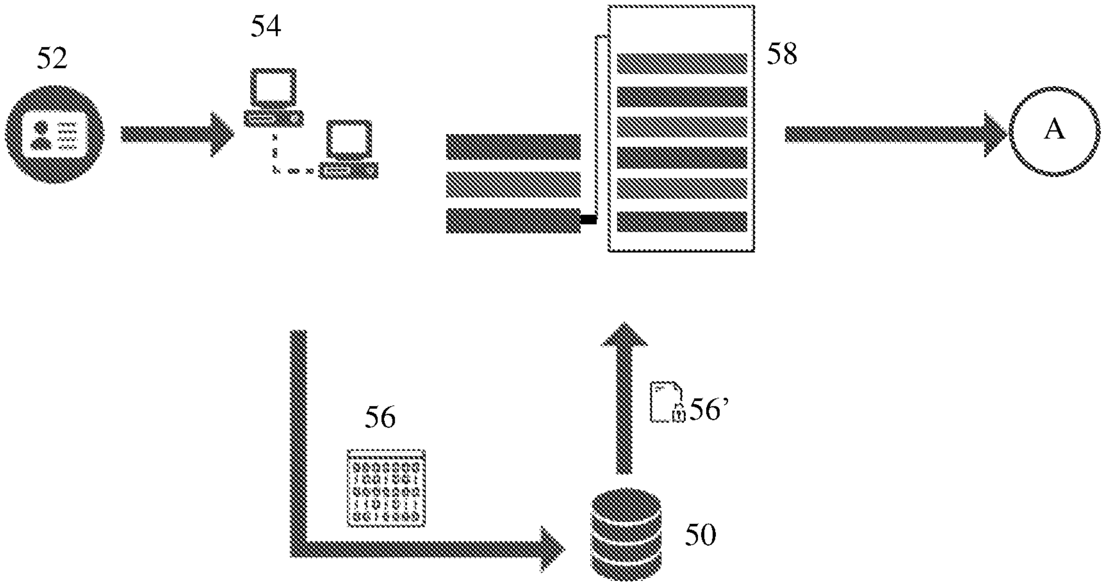
FIGS. 5A and 5B illustrate transaction flow depicting data privacy in a blockchain network using an off-chain and on-chain data storage, in accordance with the present disclosure.
Figure 5B:
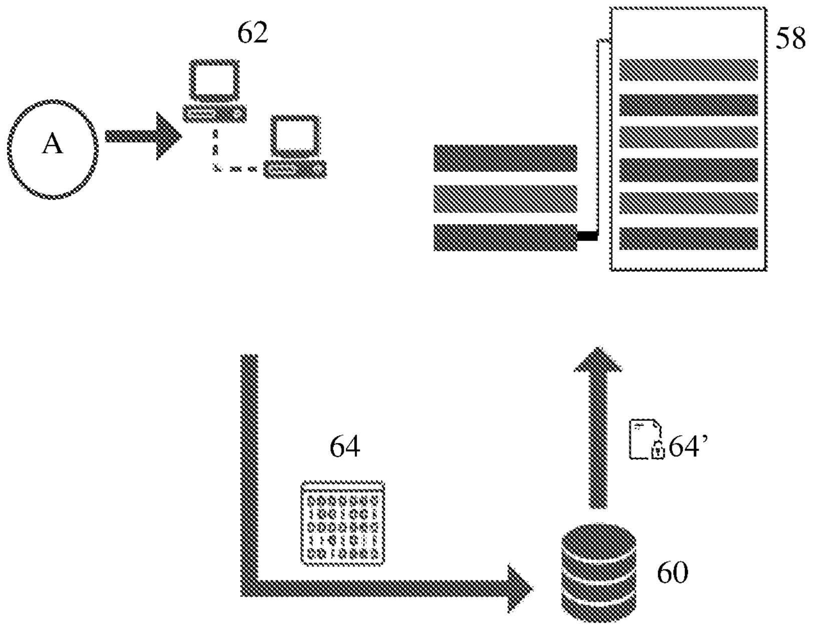

FIGS. 5A and 5B show an exemplary transaction flow between nodes of the network 100. A first participating node 54 of the network 100 receives a request 52 to conduct a transaction with a second participating node. The request comprises transaction details 56. The participating node 54 stores the complete transaction details 56 in the off-chain database 50. The participant node 54 also generates a unique identifier 56' i.e., a HASH of the transaction details 54 encrypted with a public key of destination participating node and stores the unique identifier in the ledger 58. The HASH may be generated using a standard hashing algorithm. The unique identifier 56' is received by the destination participating node 62 and decrypted with a corresponding private key of destination participating node to obtain first HASH 56. The destination participating node then requests complete transaction details to source participating node, which upon successful authentication of destination participating node, returns transaction details 64. The details 64 corresponding to this transaction will be recorded in the destination participating node off-chain database 60 and a corresponding second unique identifier 64' containing the HASH of the transaction will be stored on the ledger 58. The on-chain transaction data thus contains a transaction header with the HASH which will be visible to all participating nodes (A-F) on the network 100 and the off-chain data contains transaction details that are not visible to all the nodes (A-F) on the network 100. The off-chain data is compressed periodically using compression algorithms. As and when the data gets old, the transaction data is partitioned and compressed in the order of time, e.g., daily, weekly, monthly, quarterly, or yearly. By compressing the data, pointers to the data stored on the ledger do not change. Whenever the compressed data is to be queried, it may be decompressed using the compression algorithms.

In an operative exemplary embodiment, referring to FIGS. 3A and 3B, a source node "A" receives a request to conduct a payment transaction with a destination node "B". The transaction request comprises transaction details "TA". The transaction details "$T_{AB}$" include a plurality of data fields and may be represented as follows—

$$[(T_{AB})]=\{\text{Data field 1,Data field 2,Data field 3, . . . ,Data field } n\}$$

The system 100 receives the transaction details and stores the details in the off-chain database 30. Further, the system 100 encrypts the details to generate a unique ID or a HASH which may be represented as follows—

$$[\text{ID}(T_{AB})]=\text{HASH of }\{\text{Data field 1,Data field 2Data field 3, . . . ,Data field } n\}$$

The system 100 then broadcasts only the unique ID i.e., "[(ID($T_{AB}$)]" of the transaction to all the nodes (B-F) in the network 100. This unique ID is the HASH of "n" number of data fields that constitutes transaction details "[($T_{AB}$)]".

The generated HASH is a one-way irreversible function, meaning that the HASH of 'n' number of data fields would always be [(ID($T_{AB}$)]; but these data fields cannot be derived back using HASH i.e. [(ID($T_{AB}$)]. Hence, all other participants (B-F) in the network 100 can confidently confirm that transaction with the unique ID "[(ID($T_{AB}$)]" happened on the network 100, but no node except the source node A knows the complete details of the transaction [($T_{AB}$)].

After receiving the HASH of this transaction i.e., "[(ID ($T_{AB}$)]", the destination node B makes a private call to the source node A and requests the complete details of the transaction. Upon receiving the request, the source node A validates the identity of destination node B, and upon successful validation, the source node A may share the transaction details "[($T_{AB}$)]" with the destination node B.

Upon receiving the transaction details, the destination node 'B' encrypts the transaction details to generate the unique ID or HASH i.e., [(ID($T_{AB}$)]. If the unique ID generated by the destination node B is the same as the HASH received from the source node A, then the destination node B concludes that the source node A has sent the correct and complete details of the transaction and the data was not tampered with during transmission.

Figure 6:
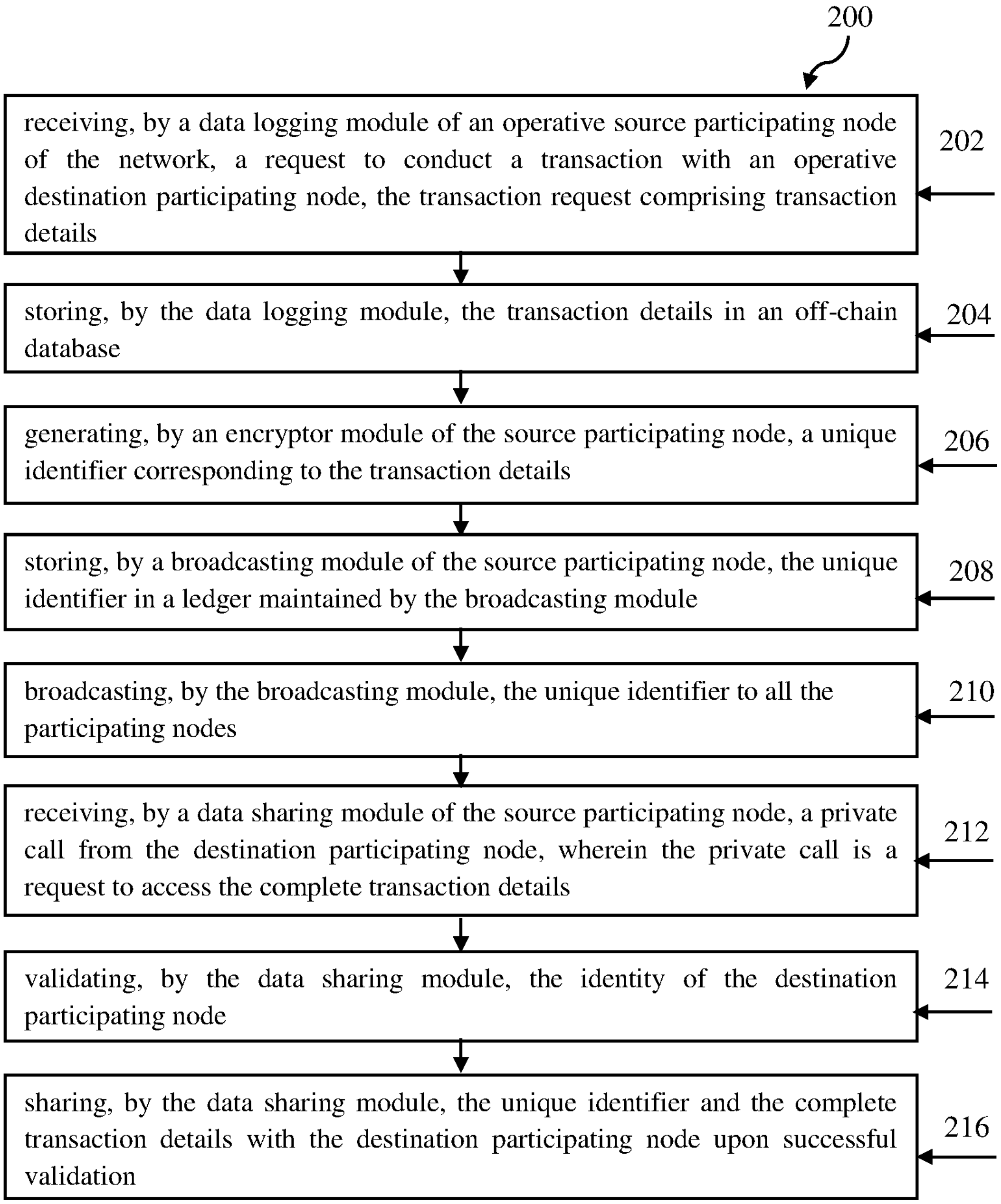
FIG. 6 illustrates a flow diagram of a method for providing data privacy in a blockchain network, in accordance with the present disclosure.
Figure 7:
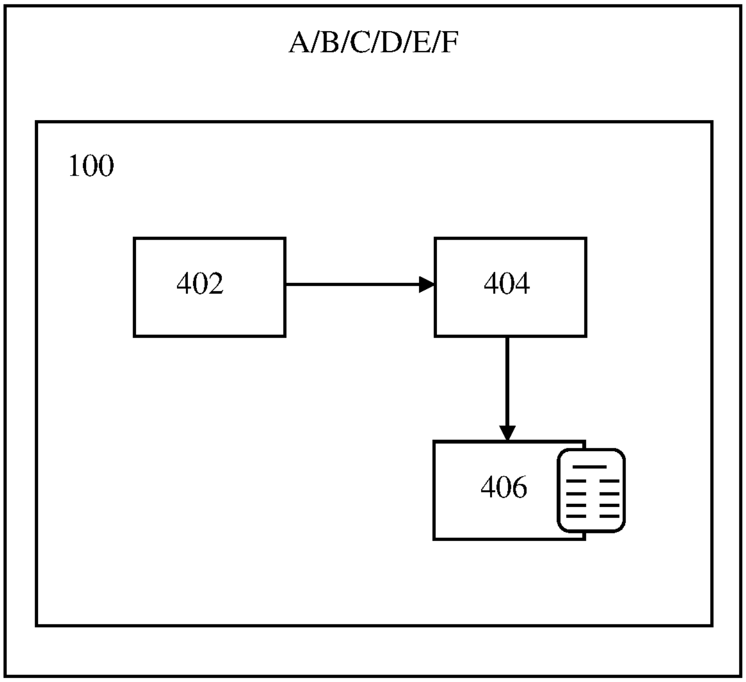
FIG. 7 illustrates a block diagram of a system for providing authentication of transaction details, in accordance with the present disclosure.

The present disclosure further envisages the method 200 for providing data privacy in a blockchain network 100. Referring to FIG. 6, the method comprises the following steps—

At step 202, a data logging module 102 of an operative source participating node of the network 20 receives a request to conduct a transaction with an operative destination participating node, the transaction request comprising transaction details.

At step 204, the data logging module 102 stores the transaction details in an off-chain database 30.

At step 206, an encryptor module 104 of the source participating node generates a unique identifier corresponding to the transaction details. This step further comprises generating a first HASH of the transaction details and encrypting the first HASH using a pre-stored public key of destination participating node.

At step 208, a broadcasting module 106 of the source participating node stores the unique identifier in a ledger maintained by the broadcasting module 106.

At step 210, the broadcasting module 106 broadcasts the unique identifier to all the participating nodes.

At step 212, a data sharing module 108 of the source participating node receives a private call from the destination participating node, wherein the private call is a request to access the complete transaction details.

At step 214, the data sharing module 108 validates the identity of the destination participating node.

At step 216, the data sharing module 108 shares the unique identifier and the complete transaction details with the destination participating node upon successful validation.

Figure 8:
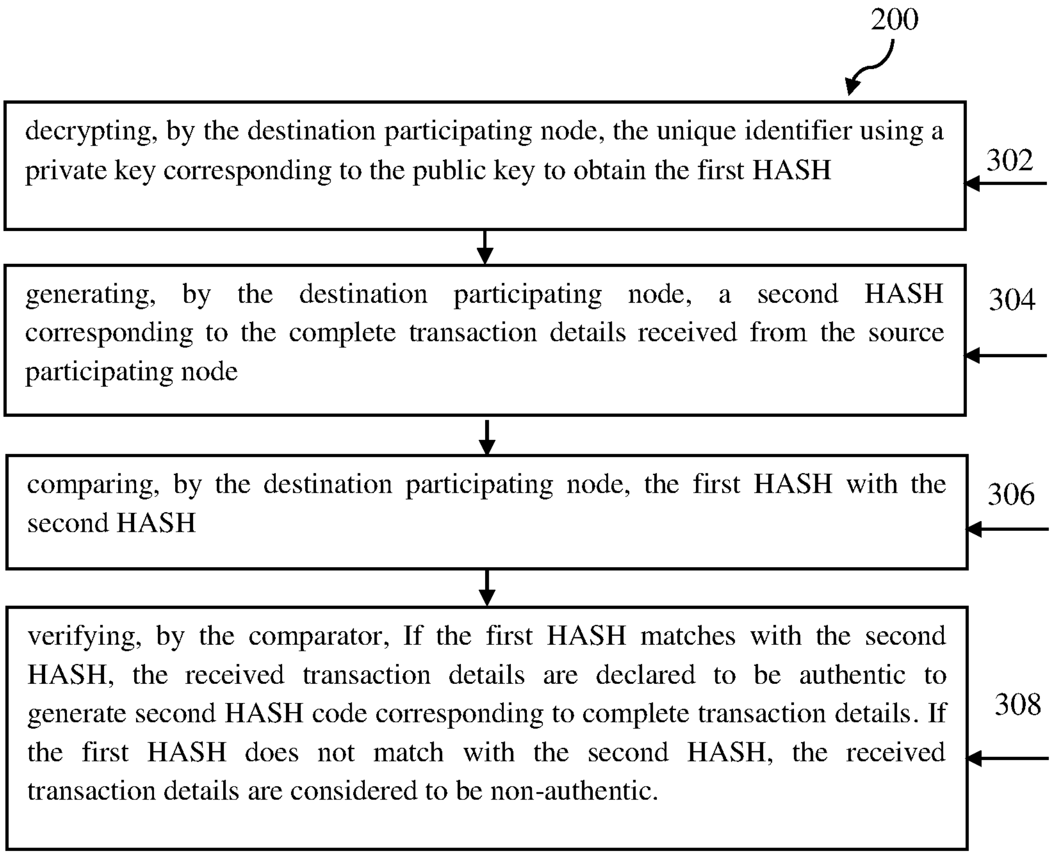
FIG. 8 illustrates a flow diagram of a method for providing authentication of transaction details, in accordance with the present disclosure.

The present disclosure further envisages the method 200 for providing authentication of transaction details. Referring to FIG. 8, the method comprises the following steps—

At step 302, the destination participating node decrypting module decrypts the unique identifier using a private key corresponding to the public key to obtain the first HASH;

At step 304, the destination participating node, HASH generator received the complete transaction details from source participating node to generates a second HASH;

At step 306, the destination participating node, the comparator used for compare the first HASH with the second HASH to verify the authenticity of the transaction details received from the source participating node; and At step 308 the destination participating node, the comparator further verifies the authentication of the received transaction, If the first HASH matches with the second HASH, the received transaction details are declared to be authentic. If the first HASH does not match with the second HASH, the received transaction details are considered to be non-authentic.

An exemplary pseudo code depicting the function of the privacy module is as follows—

```
Do
  {
  Read (transaction details from participating nodes, wherein the transaction details
  include a plurality of data fields comprises transaction identifier, a transaction
  amount, payment details of a payer of the transaction, and payment details of a payee
  of the transaction);
  Initialize privacy module;
  Calculate 'A'; // where A = Request (request to conduct a transaction)
  Calculate 'B'; // where B = Store (received transaction details in an off-chain database
  associated with the source participating node)
  Push 'A' to the data logging unit;
  Push 'B' to the encryptor module;
  Generate 'C'; // where C = Encrypts (encrypts the received transaction details, and
  generates a unique identifier corresponding to the transaction details)
  Push 'C' to the broadcasting model;
  Calculate 'D'; // where D = Broadcast (store the unique identifier in the ledger and
  broadcasts the unique identifier to all the participating nodes in the network)
  Push 'D' to the data sharing module;
  Calculate 'E'; // where E = Validate (receive a private call to permit request access to
  the complete transaction details)
  Update the status of blocks;
  }
While (detecting the transaction block creation event)
```

Advantageously, the data logging module 102, the encryptor module 104, the broadcasting module 106, the data sharing module 108, the decrypting module, the HASH generator, and the comparator may be implemented using one or more processor(s) of the nodes of the network. It can be understood that the node may be any kind of computing device, such as a computer, a laptop, or a server. The processor may be a general-purpose processor, a Field Programmable Gate Array (FPGA), an Application Specific Integrated Circuit (ASIC), a Digital Signal Processor (DSP), and/or the like. The processor may be configured to retrieve data from and/or write data to the memory. The memory may be, for example, a random-access memory (RAM), a memory buffer, a hard drive, a database, an erasable programmable read only memory (EPROM), an electrically erasable programmable read only memory (EEPROM), a read only memory (ROM), a flash memory, a hard disk, a floppy disk, cloud storage, and/or so forth.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

The foregoing description of the embodiments has been provided for purposes of illustration and is not intended to limit the scope of the present disclosure. Individual components of a particular embodiment are generally not limited to that particular embodiment, but, are interchangeable. Such variations are not to be regarded as a departure from the present disclosure, and all such modifications are considered to be within the scope of the present disclosure.

TECHNICAL ADVANCEMENTS

The present disclosure described herein above has several technical advantages including, but not limited to, the realization of a system and method for providing data privacy in a blockchain network that:

only allows the participant nodes involved in a transaction to receive complete details of the transaction;

is easy to implement;

ensures secure transaction processing;

ensures transaction data privacy; and is cost-effective.

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The foregoing description of the specific embodiments so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The use of the expression "at least" or "at least one" suggests the use of one or more elements or ingredients or quantities, as the use may be in the embodiment of the disclosure to achieve one or more of the desired objects or results.

While considerable emphasis has been placed herein on the components and component parts of the preferred embodiments, it will be appreciated that many embodiments can be made and that many changes can be made in the preferred embodiments without departing from the principles of the disclosure. These and other changes in the preferred embodiment as well as other embodiments of the disclosure will be apparent to those skilled in the art from the disclosure herein, whereby it is to be distinctly understood that the foregoing descriptive matter is to be interpreted merely as illustrative of the disclosure and not as a limitation.

The invention claimed is:

1. A system (100) for providing data privacy in a blockchain network (20), the blockchain network (20) comprising a plurality of participating nodes and a clearing house node, said system (100) comprising:

i. a data logging module (102), of an operative source participating node, configured to receive a request to conduct a transaction with an operative destination participating node, the transaction request comprising transaction details, said data logging module (102) further configured to store the received transaction details in an off-chain database (30) associated with the source participating node;

ii. an encryptor module (104), of the source participating node, configured to receive the transaction details from said data logging module (102) and further configured to encrypt the received transaction details and generate a unique identifier corresponding to the transaction details;

iii. a broadcasting module (106), of the source participating node, configured to maintain a ledger, said broadcasting module (106) configured to cooperate with said encryptor module (104) to store the unique identifier in said ledger (58), and broadcast the unique identifier to all the participating nodes in the network (100); and iv. a data sharing module (108), of the source participating node, configured to receive a private call from the destination participating node, wherein the private call is a request to access the complete transaction details, said data sharing module (108) configured to validate the identity of the destination participating node and share the transaction details with the destination participating node upon successful validation.

2. The system as claimed in claim 1, wherein said unique identifier comprises a first HASH of the transaction details encrypted using a pre-stored public key of destination participating node.

3. The system as claimed in claim 2, wherein the destination participating node comprises:

i. a decrypting module configured to decrypt the unique identifier using a private key corresponding to said public key to obtain the first HASH;

ii. a HASH generator configured to generate a second HASH corresponding to the complete transaction details received from the source participating node; and iii. a comparator configured to compare the first HASH with the second HASH to verify the authenticity of the transaction details received from the source participating node.

4. The system as claimed in claim 1, wherein the transaction details include a plurality of data fields, the data fields comprise at least one of a transaction identifier, a transaction amount, payment details of a payer of the transaction, and payment details of a payee of the transaction.

5. The system as claimed in claim 4, wherein the payment details of the payer include a payment address containing an indicator of a financial entity associated with the payer and the payment details of the payee include a payment address containing an indicator of the financial entity associated with the payee.

6. The system as claimed in claim 1, wherein said data sharing module (108) validates the identity of the participating destination node by checking if the participating destination node was a part of the conducted transaction.

7. The system as claimed in claim 1, wherein said data logging module (102) is configured to periodically compress the transaction details stored in said off-chain database (30), wherein upon receiving the private call from the destination participating node, said data sharing module (108) is configured to query the off-chain database, extract the compressed transaction details requested by the destination participating node, and decompress the extracted transaction details.

8. A method for providing data privacy in a blockchain network (20), the blockchain network (20) comprising a plurality of participating nodes and a clearing house destination participating node, said method (200) comprising:

i. receiving (202), by a data logging module (102) of an operative source participating node of the network (20), a request to conduct a transaction with an operative destination participating node, the transaction request comprising transaction details;

ii. storing (204), by the data logging module (102), the transaction details in an off-chain database (30);

iii. generating (206), by an encryptor module (104) of the source participating node, a unique identifier corresponding to the transaction details;

iv. storing (208), by a broadcasting module (106) of the source participating node, the unique identifier in a ledger maintained by the broadcasting module (106);

v. broadcasting (210), by the broadcasting module (106), the unique identifier to all the participating nodes;

vi. receiving (212), by a data sharing module (108) of the source participating node, a private call from the destination participating node, wherein the private call is a request to access the complete transaction details, vii. validating (214), by said data sharing module (108), the identity of the destination participating node; and viii. sharing (216), by said data sharing module (108), the unique identifier and the complete transaction details with the destination participating node upon successful validation.

9. The method as claimed in claim 8, wherein the step (206) of generating, by the encryptor module (104) of the source participating node, the unique identifier corresponding to the transaction details comprises:

i. generating a first HASH of the transaction details; and ii. encrypting the first HASH using a pre-stored public key of the destination participating node.

10. The method as claimed in claim 8, which further comprises:

i. decrypting, by the destination participating node, the unique identifier using a private key corresponding to said public key to obtain the first HASH;

ii. generating, by the destination participating node, a second HASH corresponding to the complete transaction details received from the source participating node; and iii. comparing, by the destination participating node, the first HASH with the second HASH to verify the authenticity of the transaction details received from the source participating node.

* * * * *